US008595098B2

(12) United States Patent
Starai et al.

(10) Patent No.: US 8,595,098 B2
(45) Date of Patent: Nov. 26, 2013

(54) TRANSMISSION OF SENSITIVE CUSTOMER INFORMATION DURING ELECTRONIC-BASED TRANSACTIONS

(75) Inventors: Nicholas J. Starai, Wayne, IL (US); Matthew M. Schmidgall, Bartlett, IL (US)

(73) Assignee: Network Merchants, Inc., Roselle, IL (US)

( * ) Notice: Subject to any disclaimer, the term of this patent is extended or adjusted under 35 U.S.C. 154(b) by 330 days.

(21) Appl. No.: 12/381,959

(22) Filed: Mar. 18, 2009

(65) Prior Publication Data

US 2010/0241565 A1    Sep. 23, 2010

(51) Int. Cl.
*G06Q 40/00*    (2012.01)
(52) U.S. Cl.
USPC ............................................. 705/35; 705/38
(58) Field of Classification Search
CPC ..................................................... G06Q 40/00
USPC .......................................................... 705/35
See application file for complete search history.

(56) References Cited

U.S. PATENT DOCUMENTS

| 5,557,518 | A  | 9/1996  | Rosen            |
| 5,815,657 | A  | 9/1998  | Williams et al.  |
| 5,826,241 | A  | 10/1998 | Stein et al.     |
| 5,987,140 | A  | 11/1999 | Rowney et al.    |
| 6,016,484 | A  | 1/2000  | Williams et al.  |
| 6,839,692 | B2 | 1/2005  | Carrott et al.   |
| 7,058,611 | B2 | 6/2006  | Kranzley et al.  |
| 7,120,609 | B1 | 10/2006 | Kerkdijk         |
| 7,210,620 | B2 | 5/2007  | Jones            |
| 2001/0029485 | A1 | 10/2001 | Brody et al.   |
| 2002/0023054 | A1 | 2/2002  | Gillespie      |
| 2002/0062281 | A1 | 5/2002  | Singhal        |
| 2004/0093277 | A1 | 5/2004  | Faerch et al.  |
| 2006/0031161 | A1 | 2/2006  | D'Agostino     |
| 2006/0144925 | A1 | 7/2006  | Jones          |
| 2006/0271497 | A1 | 11/2006 | Cullen et al.  |
| 2007/0011103 | A1 | 1/2007  | Foster         |

(Continued)

FOREIGN PATENT DOCUMENTS

| WO | WO 01/78493 A2   | 10/2001 |
| WO | WO 02/46976 A1   | 6/2002  |
| WO | WO 2004/114168 A1 | 12/2004 |

*Primary Examiner* — Bruce I Ebersman
*Assistant Examiner* — John Anderson
(74) *Attorney, Agent, or Firm* — Carmen Patti Law Group, LLC

(57) ABSTRACT

An exemplary method is implemented by a payment gateway for processing electronic transactions. A token-ID that is unique to each transaction is generated, and on receiving a request to initiate an electronic transaction from a merchant server, a first message is transmitted to the merchant server that includes a first token-ID. A communication is received from an electronic device of a cardholder that contains information about the cardholder's credit card account and the first token-ID. A record is stored that includes the first token-ID and information enabling the credit card account of the cardholder to be identified. On receiving a second request, that includes the first token-ID, from the merchant server for payment of a specified amount, the credit card account of the cardholder to be debited for the requested payment is identified based on the token-ID. A determination is made if the cardholder's credit card account was successfully debited for the requested payment, and a second message is transmitted to the merchant server that specifies if the requested payment transaction was successfully completed.

12 Claims, 4 Drawing Sheets

(56) References Cited

U.S. PATENT DOCUMENTS

| | | |
|---|---|---|
| 2007/0170245 A1 | 7/2007 | Elbaum et al. |
| 2007/0288377 A1 | 12/2007 | Shaked |
| 2008/0222049 A1* | 9/2008 | Loomis et al. .................. 705/75 |
| 2008/0270258 A1* | 10/2008 | Brown et al. ................... 705/26 |
| 2009/0327133 A1* | 12/2009 | Aharoni et al. ................. 705/44 |
| 2009/0327140 A1* | 12/2009 | Kuo ............................... 705/71 |

* cited by examiner

TRANSMISSION OF SENSITIVE CUSTOMER INFORMATION DURING ELECTRONIC-BASED TRANSACTIONS

BACKGROUND

This invention relates to the electronic processing of transactions completed by transmitting and receiving transaction information among customers, merchants and payment processors. This includes, but is not limited to, credit card transactions made over the internet. The invention is more specifically directed to how sensitive customer information, e.g. credit card data, is handled during electronic-based transactions in communications among the customer, merchant and payment processor.

Credit and/or debit card transactions made over data networks, e.g. internet, provide an ever-increasing percentage of transactions especially for retail customers. A credit cardholder is required to input his credit card information when purchasing goods or services from a merchant's web site. The merchant transmits the credit card number (and any other required information, e.g. expiration date) along with information concerning the merchandise being purchased to a gateway of the payment processor. The gateway converts the credit card transaction information into a format and signaling protocol required by a credit card payment processor associated with the institution or association that issued the cardholder's credit card. The gateway transmits the converted information to the credit card processor for validation and acceptance of the transaction. The result of the transaction is transmitted from the processor back through the payment gateway to the originating merchant. Typically the merchant will provide the customer with an acknowledgement of completion of the transaction.

This electronic transaction process is similar to a customer making a credit card purchase during the checkout process in the store of a merchant, e.g. paying for groceries at a grocery store. In both an in-person purchase and an electronic purchase, the customer's credit card information is provided to the merchant who forwards it to the payment processor for authorization of the subject purchase. While this process has generally proved satisfactory, there are examples where the customer's credit card information has been compromised either intentionally or unintentionally by the merchant or by the handling and/or storage of this information by the merchant.

SUMMARY

In accordance with the present invention, there is a recognized need to provide improved security for the customer's credit card information by eliminating it from being transmitted to or through the merchant during an electronic transaction. It is an object of the present invention to satisfy this need.

In one embodiment of the present invention, an exemplary method is implemented by a payment gateway for processing electronic transactions. A token-ID that is unique to each transaction is generated, and on receiving a request to initiate an electronic transaction from a merchant server, a first message is transmitted to the merchant server that includes a first token-ID. A communication is received from an electronic device of a cardholder that contains information about the cardholder's credit card account and the first token-ID. A record is stored that includes the first token-ID and information enabling the credit card account of the cardholder to be identified. On receiving a second request, that includes the first token-ID, from the merchant server for payment of a specified amount, the credit card account of the cardholder to be debited for the requested payment is identified based on the token-ID. A determination is made if the cardholder's credit card account was successfully debited for the requested payment, and a second message is transmitted to the merchant server that specifies if the requested payment transaction was successfully completed.

Another embodiment of the present invention includes a processor gateway that implements this method.

A further embodiment of the present invention includes an article including one or more computer-readable signal-bearing tangible media for causing the implementation of the method.

DESCRIPTION OF THE DRAWINGS

Features of exemplary implementations of the invention will become apparent from the description, the claims, and the accompanying drawings in which:

DETAILED DESCRIPTION

Figure 1:
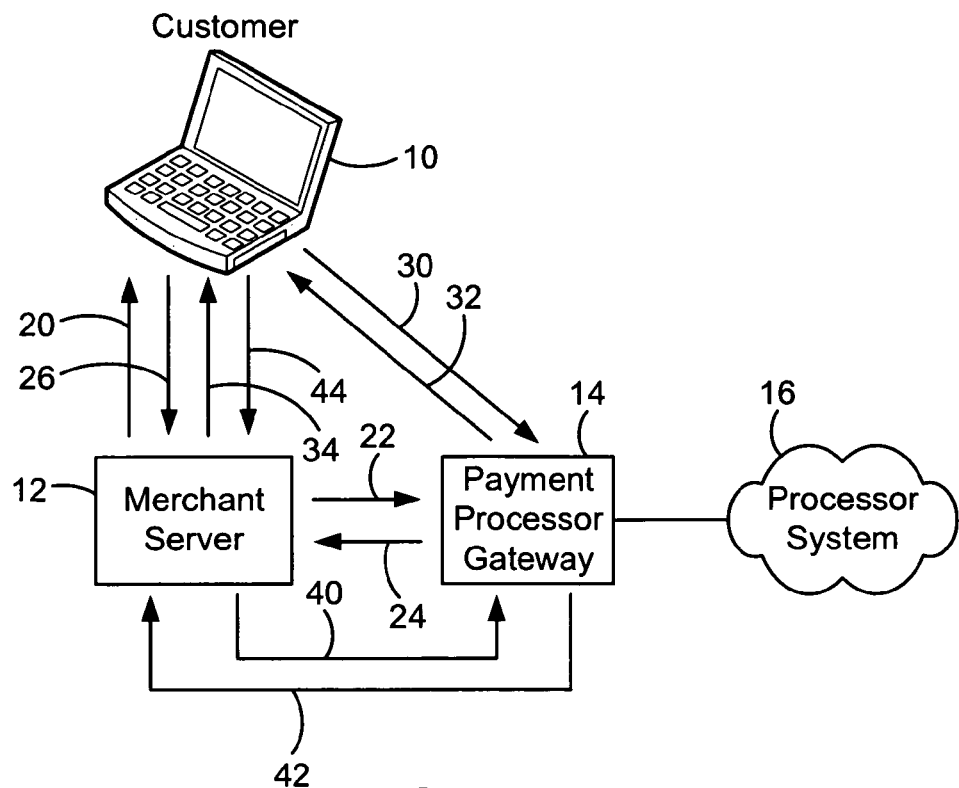
FIG. 1 is a block diagram illustrating an exemplary network for processing electronic transactions in accordance with the present invention.

FIG. 1 shows an exemplary system suited for incorporation of the method in accordance with the present invention. In this exemplary system, a customer utilizes an electronic communication device 10, e.g. laptop personal computer, that has communications enabled through the Internet. The electronic communication device 10 may consist of any device capable of transmitting and receiving electronic communications, including but not limited to, personal computers, personal digital assistants and enhanced cellular telephones. The device 10 may at times be referred to as PC 10 herein to enhance readability without limiting the types of devices as explained above. A merchant server 12 and a payment processor gateway 14 are able to communicate with each other as well as PC 10, such as by known HTML capable browsers. In this example the PC 10 is able to communicate by the Internet with the merchant server 12 and the payment processor gateway 14. Communications between the merchant server 12 and the payment processor gateway 14 may also be provided through the Internet or through a private data network. The payment processor gateway 14 is connected to a processor system 16 that includes a database containing customer records and has the ability to authenticate and process credit transaction requests associated with customer accounts. The merchant server 12 hosts the merchant's Internet website by which customers can identify goods and/or services provided by the merchant that are available to be purchased. The numbered arrows in FIG. 1 represent communications associated with steps that are explained in detail below.

One aspect in accordance with the present invention resides in allowing an electronic transaction involving a charge to the customer's credit card to be completed without the credit card information being accessible to the merchant. That is, the customer's credit card information, i.e. card number, expiration date, cvv, etc., transmitted from PC 10 is not communicated to or through the merchant server 12 in association with a purchase of goods and/or services hosted by the merchant server 12. This provides increased security of the credit card information to the customer and eliminates the merchant's burden of having to provide security to maintain such data. Additional aspects and features of the present invention will be apparent from the following description.

Figure 2:
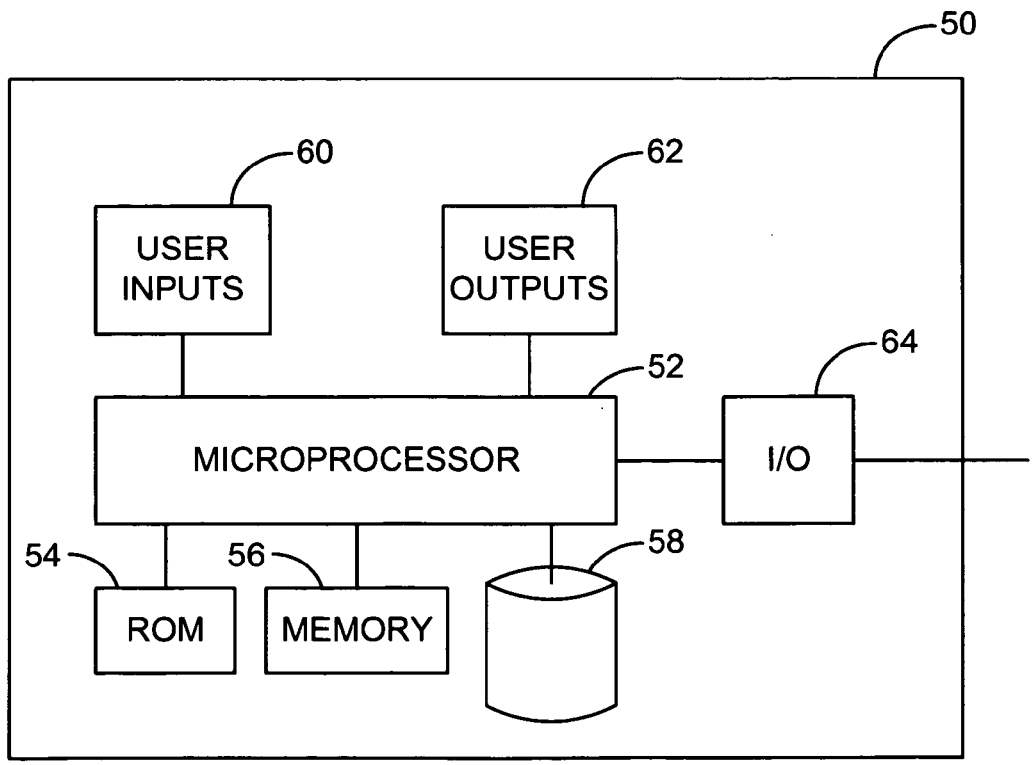
FIG. 2 is a diagram of an exemplary payment processor gateway as shown in FIG. 1.

FIG. 2 is a block diagram of a payment processor gateway 50 which may serve as the gateway 14 shown in FIG. 1. A microprocessor 52 is connected to read-only memory (ROM) 54, random access memory (RAM) 56 and a nonvolatile source of data storage 58 such as a hard disk drive. The microprocessor 52 is also able to receive inputs from user inputs 60, e.g. keyboard, mouse, microphone, etc., and to provide outputs to user outputs 62, e.g. monitor, speakers, printer, etc. An input/output (I/O) device 64 is coupled to microprocessor 52 and facilitates communications with external devices, including but not limited to, communications over a data network and/or Internet. As will be understood by those skilled in the art, data and stored program instructions in ROM 54 is typically utilized by microprocessor 52 to initialize and boot the server. One or more application program, e.g. programs that control the implementation of the steps taken by the gateway, can be stored in the nonvolatile storage element 58. At least active portions of the application program(s) will be typically stored in RAM 56 for ready access and processing by the microprocessor 52 during the execution of the application program. The application programs, operating in conjunction with an operating system, may include an HTML communication program or module, e.g. a browser, and a transaction interface program suited to provide an interface between information received from PC 10 or merchant server 12 and the processor system which contains the cardholder account information. The combination of components in the payment processor gateway 50 forms a processing unit.

Figure 3:
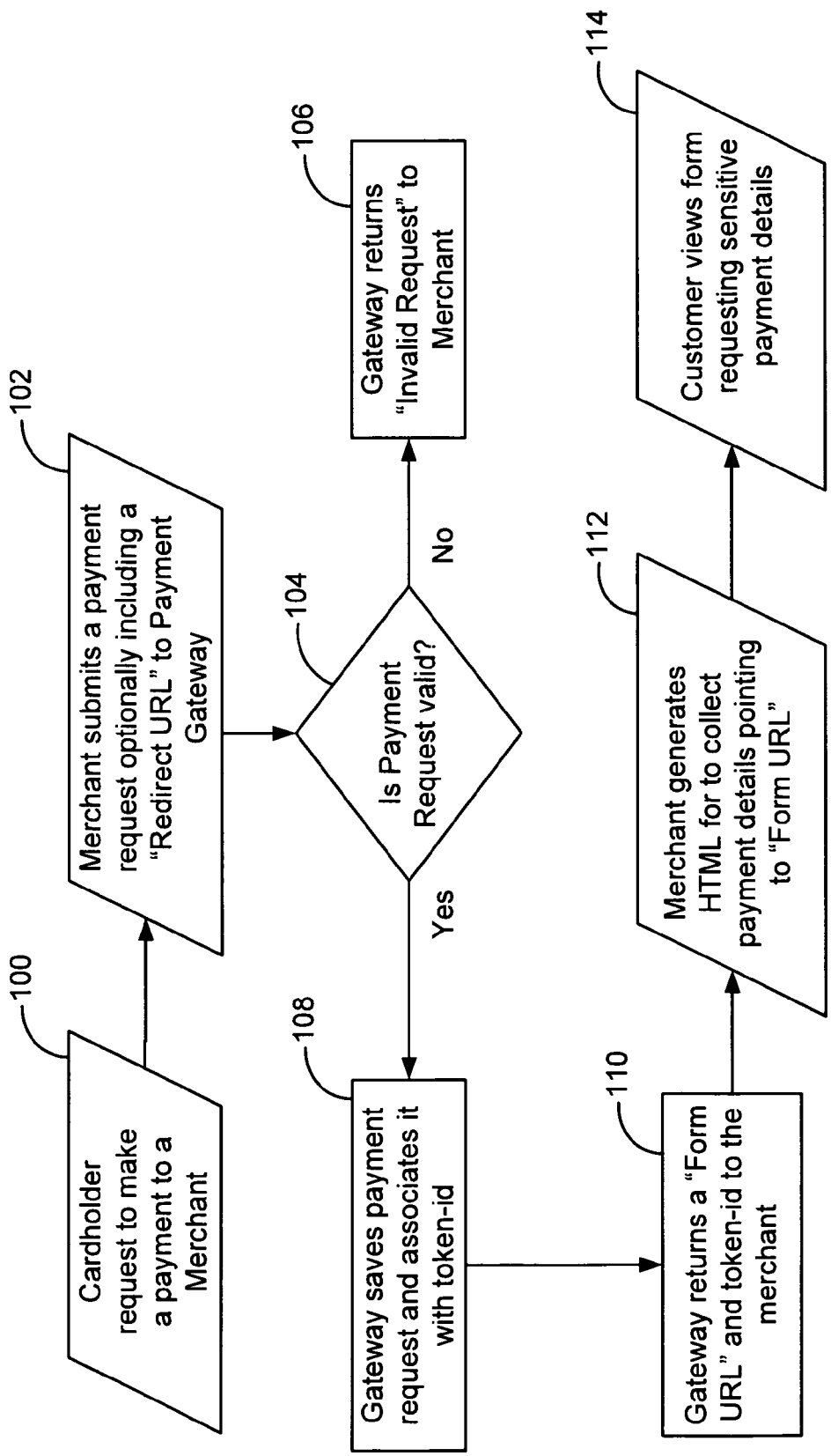
FIG. 3 is a flow diagram illustrating a first series of steps associated with electronic processing in accordance with an exemplary method of the present invention.

FIG. 3 illustrates an exemplary first series of steps associated with the processing of an electronic transaction in which a customer utilizes PC 10 to make a credit card purchase of goods offered by the merchant as displayed on the merchant server 12. In this example communications by the merchant server 12 and the payment processor gateway 14 with the PC 10 is by the Internet. Communications between the merchant server 12 and the payment processor gateway 14 is by private data network, although such communications could be transmitted by the Internet. Reference should be concurrently made to FIG. 1 in the below description, especially when reference is made to communications or events having reference numerals less than 100.

In step 100 the customer, also referred to as the cardholder, has been in communications with the merchant server 12 and has elected to purchase certain selected goods from the merchant. As part of the electronic transaction, the customer transmits a request 20 to provide payment to the merchant using the customer's credit card. Upon receiving this request, the merchant server 12 submits a payment request 22 in step 102 to gateway 14, where the request may include a "redirect URL" address that points back to the merchant server 12. The purpose of the redirect URL is explained as part of the description of FIG. 4. In step 104 the gateway 14 determines if the payment request is valid, e.g. verifies identity of the merchant. A NO determination by step 104, indicating that the payment request was not valid, results in the gateway 14 transmitting an "invalid request" message back to the merchant server 12. A YES determination by step 104, indicating that the payment request was validated, causes the gateway 14 to store the payment request and associate it with a token identification (token-ID) that is unique to the subject transaction. The token-ID may consist of a series of alphanumeric characters that is unique for each electronic transaction. In step 110 the gateway 14 transmits a communication to the merchant server 12 that includes a "form URL" and the token-ID. The "form URL" may consist of a hypertext transfer protocol (HTTP) uniform resource identifier (URI) residing on the gateway 14. The communication transmitted from the gateway 14 to merchant server 12 by step 106 or 110 is represented by communication 24.

In step 112 the merchant server 12 generates and transmits to PC 10 by communication 26 an HTML form to collect payment details from the customer, where the form points to the "form URL" received from the gateway 14. In step 114 the customer views the received form from the merchant server 12 which includes the "form URL" contained requested credit card information, e.g. the credit cardholder's name, credit card number, expiration date, cvv number, etc.

Figure 4:
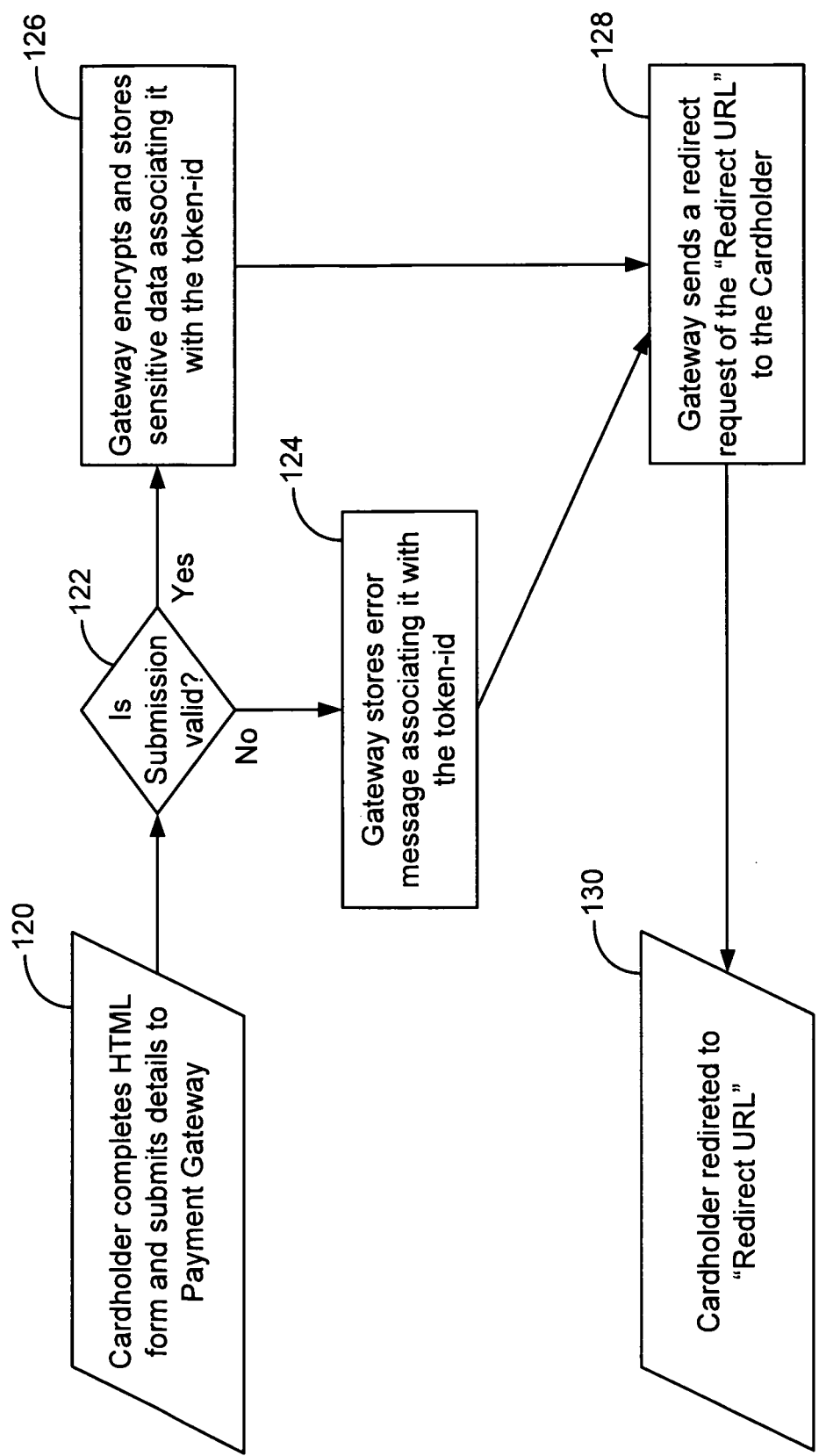
FIG. 4 is a flow diagram illustrating a second series of steps associated with electronic processing in accordance with an exemplary method of the present invention.

FIG. 4 illustrates a second series of exemplary steps associated with the electronic transaction. At the beginning of these steps, the customer of PC 10 has received the HTML form from the merchant server 12. In step 120 the customer completes the HTML form and transmits by communication 30 the completed form with credit card information to the payment gateway 14. In step 122 a determination is made by the gateway 14 of whether the submission is valid, e.g. is the credit card information and token-ID valid? A NO determination by step 122 results in gateway 14 storing an error message associated with the token-ID in step 124. A YES determination by step 122 results in the gateway 14 encrypting and storing the sensitive credit card information in association with the assigned token-ID in step 126. In step 128 Gateway 14 transmits in communication 32 a request to the PC 10 to utilize the "redirect URL" that points to the address of the merchant server 12. In step 130 the PC 10 is redirected at communication 34 in accordance with the redirect URL address containing the unique token-ID to the merchant server 12.

Figure 5:
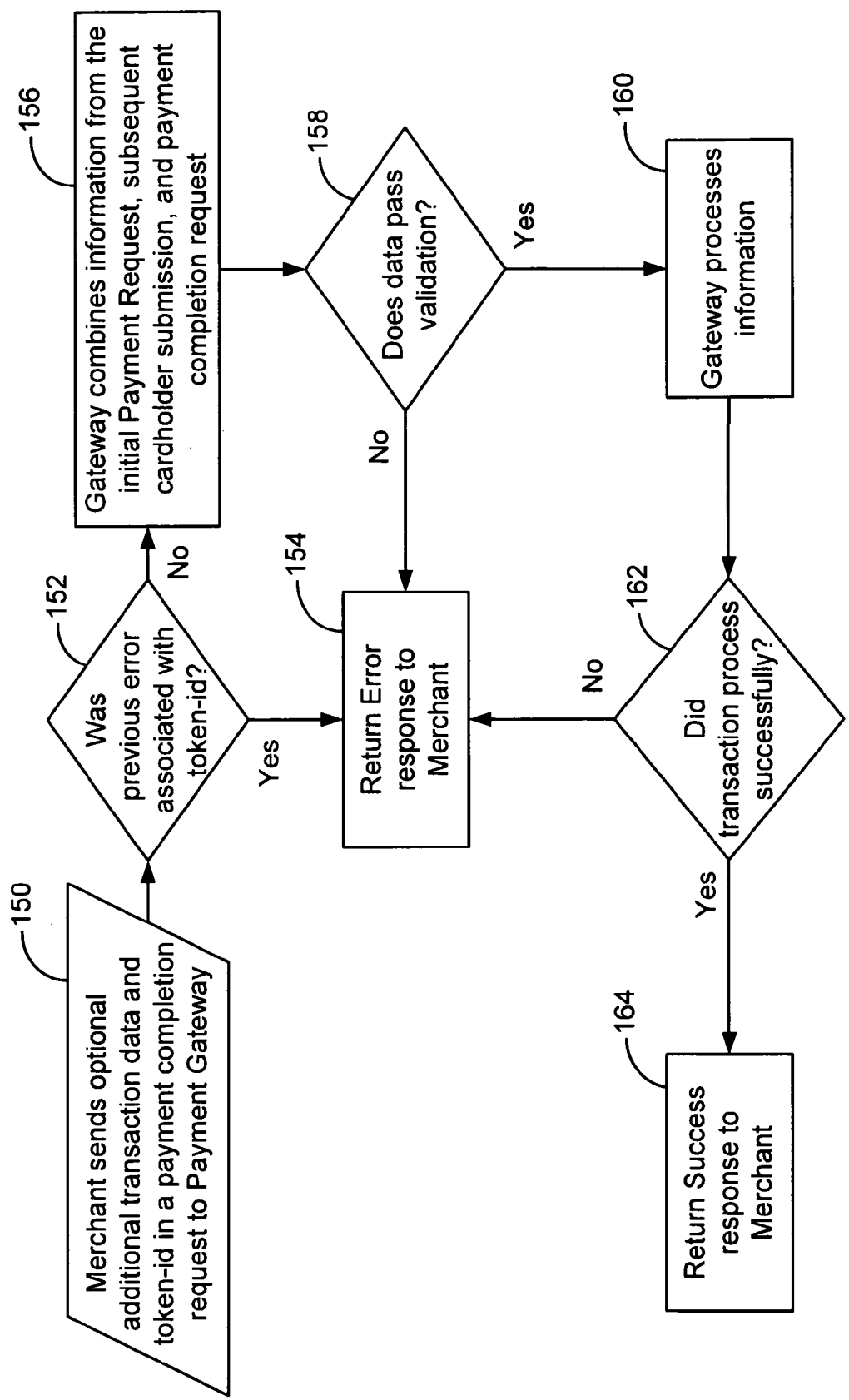
FIG. 5 is a flow diagram illustrating a third series of steps associated with electronic processing in accordance with an exemplary method of the present invention.

FIG. 5 illustrates a third series of exemplary steps associated with the electronic transaction. In step 150 merchant server 12 transmits the token-ID, and may send optional additional transaction data, to the gateway 14 by communication 40. In step 152 the gateway 14 determines whether a previous error was associated with the token-ID. A YES determination by step 152 results in the gateway 14 returning an error response to the merchant server 12 in step 154. A NO determination by step 152 results in the gateway 14 combining the information contained in the initial payment request (step 108) from the merchant server 12, subsequent cardholder submission of credit card information (step 126), and the current payment completion request from the merchant server 12. The token-ID is used as an index by the gateway 14 to locate and associate all of the relevant stored information. In step 158 Gateway 14 makes a determination of whether the combined data passes validation. A NO determination by step 158 results in the merchant server 12 receiving an error response by step 154. A YES determination by step 158 results in the gateway 14 in association with the processor system 16 processing the credit card payment request in step 160. It should be noted that the actual processing of the debit to be made to the account of the cardholder associated with the transaction did not begin until specifically requested by the merchant server 12 in step 150. In step 162 a determination is made of whether the transaction processed successfully, i.e. was the cardholder's account successfully debited with the amount associated with the transaction? A NO determination by step 162 results in an error response being transmitted to the merchant at step 154. A YES determination by step 162 results in the merchant server 12 being transmitted a message indicating successful transaction completion in step 164. The communication 42 represents either the transmission of an error message or successful completion from the gateway 14 to the merchant server 12.

An aspect of the present invention resides in providing the merchant with the ability to control the initial interaction with the gateway 14 without having received a customer transaction request. Although the merchant may elect to have the merchant server request a form URL and associated token-ID upon the receipt of a transaction request from a customer, the merchant can request a series of form URLs and associated token-IDs from the payment system without the merchant server having received corresponding customer requests. For example, the merchant could elect to obtain and store a large number of form URLs and associated token-IDs in anticipation of receipt of a large number of customer requests within a short time interval, e.g. tickets going on sale through the merchant for a very popular event. Having this information already available and stored on the merchant server ready to be associated with received customer transaction requests would decrease the overhead and bandwidth demands that would otherwise be placed on the merchant server and payment processor to handle a large number of initial payment requests within a short time interval. This capability is provided to the merchant server by the payment processor gateway fulfilling requests for "form URLs" and corresponding token-IDs without requiring information associated with an identified cardholder or information about the transaction as a precondition.

A further aspect of the present invention resides in the ability of the merchant server to control how the payment request form is displayed on the screen of PC 10. That is, the displayed page on PC 10 when the credit card data is requested can be customized by the merchant to have a look and feel as customized by the merchant. This would not be possible if the customer were merely directed by a merchant to communicate directly with a payment processing gateway where the payment processing gateway controlled the information displayed on the screen of the PC. This capability is facilitated by the payment processor gateway transmitting "form URLs" which form a module that is incorporated by the merchant server into a customized screen page transmitted to the cardholder's PC.

Another aspect associated with the present invention resides in the ability of the merchant to control when the request to actually debit the account of the customer occurs. That is, the completion of the payment transaction is controlled by the merchant. A merchant may defer requesting the debiting of the customer's credit card (communication 40) until desired by the merchant. For example, a merchant may desire to attempt to up-sell the customer with other or additional merchandise prior to the completion of the existing transaction so that the current transaction can be modified to include the previously selected merchandise as well as additional merchandise as a single order. The ability of the merchant to control the time of the credit card debiting request may also be advantageous in times of high purchasing traffic by mediating the bandwidth required by the merchant server and/or the payment gateway. This capability is facilitated by the generation and assignment of unique token-IDs by the payment processor gateway for each transaction request from the merchant server, wherein the token-ID permits the stored credit card information transmitted from the cardholder's PC to be later associated with the transaction completion request from the merchant server in order to complete a transaction.

Although the illustrative embodiment shows a payment processor gateway implemented as a separate apparatus, those skilled in the art will understand that the functionality provided by the gateway could be incorporated into other apparatus. For example, a large processor system could elect to incorporate its own gateway that would be part of the processor system. Similarly, a large merchant could elect to incorporate its own gateway that would be part of the merchant server.

The gateway 14 in one example employs one or more computer-readable tangible signal-bearing media. The computer-readable signal-bearing media store software, firmware and/or assembly language for performing one or more portions of one or more embodiments of the invention. Examples of a computer-readable tangible signal-bearing medium comprise the recordable database storage medium 58. The computer-readable signal-bearing medium may comprise one or more of a magnetic, electrical, optical, biological, and atomic data storage medium. For example, the computer-readable signal-bearing medium may include floppy disks, magnetic tapes, CD-ROMs, DVD-ROMs, hard disk drives, and electronic memory.

The functions of the various elements shown in the FIGs., including any functional blocks labeled as "microprocessors", may be provided through the use of dedicated hardware as well as hardware capable of executing software. When provided by a microprocessor, the functions may be provided by a single dedicated microprocessor, by a single shared microprocessor, or by a plurality of individual microprocessors, some of which may be shared. Moreover, explicit use of the term "microprocessor" or "controller" should not be construed to refer exclusively to hardware capable of executing software, and may implicitly include, without limitation, digital signal microprocessor (DSP) hardware, network microprocessor, application specific integrated circuit (ASIC), field programmable gate array (FPGA), read only memory (ROM) for storing software, random access memory (RAM), and non volatile storage. Other hardware, conventional and/or custom, may also be included.

Although exemplary implementations of the invention have been depicted and described in detail herein, it will be apparent to those skilled in the art that various modifications, additions, substitutions, and the like can be made without departing from the spirit of the invention. The scope of the invention is defined in the following claims.

We claim:

1. A method implemented by a payment gateway for processing electronic transactions comprising the steps of:
    receiving a first request to initiate an electronic transaction from a merchant server;
    in response to receipt of the first request, generating a token-ID by the payment gateway that is unique to the electronic transaction and transmitting a first message to the merchant server that includes the token-ID, the token-ID uniquely identifying a transaction and at the initial generation of the token-ID is not associated with any particular cardholder;
    after the generating and transmitting of the token-ID, receiving a communication from an electronic device of a cardholder where the communication includes the cardholder's credit card account number and the token-ID, said communication received by the payment gateway from the electronic device of the cardholder without said communication being accessible to the merchant server and without said communication being transmitted through the merchant server;

storing a record that includes the token-ID and the cardholder's credit card account number;

after receipt by the payment gateway of the communication from the electronic device of a cardholder, receiving a second request from the merchant server for payment of a specified amount, where the second request includes the token-ID;

identifying said record based on the token-ID and determining the associated credit card account number of the cardholder stored with said record to be debited for the requested payment;

determining if the cardholder's credit card account was successfully debited for the requested payment;

transmitting a second message to the merchant server that specifies if the requested payment transaction was successfully completed;

whereby improved security for the cardholder's credit card account number is achieved since the cardholder's credit card account number is never transmitted via the merchant server during an electronic transaction.

2. The method of claim 1 wherein the first message transmitted to the merchant server also includes a form URL, where the form URL provides a form to be transmitted by the merchant server to the electronic device of the cardholder, the form identifying credit card account information of the cardholder to be input by the cardholder.

3. The method of claim 1 wherein the first request contains no identification of the cardholder and no information about the transaction.

4. The method of claim 1 wherein the cardholder's credit card account is not processed for the payment of the transaction until the receipt of a second request from the merchant server.

5. A payment gateway that processes electronic transactions comprising:

an input/output device of a processing unit receives a first request to initiate electronic transaction from a merchant server;

the processing unit generates and transmits, in response to receipt of the first request, a first message to the merchant server that includes a token-ID that is unique to the first requested electronic transaction, the token-ID uniquely identifying a transaction and at the initial generation of the token-ID is not associated with any particular cardholder;

the input/output device of the processing unit, after the generating and transmitting of the token-ID, receives a communication from an electronic device of a cardholder where the communication includes the cardholder's credit card account number and the token-ID, said received communication from the electronic device of the cardholder being inaccessible to the merchant server and without said communication being transmitted through the merchant server;

a memory in the processing unit stores a record that includes the token-ID and the cardholder's credit card account number;

the input/output device of the processing unit, after receipt of the communication from the electronic device of a cardholder, receives a second request from the merchant server for payment of a specified amount, where the second request includes the token-ID;

the processing unit identifies said record based on the token-ID and determines the associated credit card account number of the cardholder to be debited for the requested payment;

the processing unit determines if the cardholder's credit card account was successfully debited for the requested payment;

the processing unit transmits a second message via the input/output device to the merchant server that specifies if the requested payment transaction was successfully completed, whereby improved security for the cardholder's credit card information is achieved since the cardholder's credit card information is never transmitted via the merchant server during an electronic transaction.

6. The payment gateway of claim 5 wherein the first message transmitted to the merchant server also includes a form URL, where the form URL provides a form to be transmitted by the merchant server to the electronic device of the cardholder, the form identifying credit card account information of the cardholder.

7. The payment gateway of claim 5 wherein the first request contains no identification of the cardholder and no information about the transaction.

8. The payment gateway of claim 7 wherein the processing unit does not process the cardholder's credit card account for the payment of the transaction until the receipt of a second request from the merchant server.

9. An article, comprising:

one or more computer-readable signal-bearing tangible media medium containing computer-readable information for execution by a payment gateway;

computer-readable medium in the one or more media for computer-readable medium enabling receipt of a first request to initiate electronic transaction from a merchant server;

computer-readable medium in the one or more media for enabling the generation and transmission, in response to receipt of the first request, of a first message to the merchant server that includes a token-ID unique to the first requested electronic transaction, the token-ID uniquely identifying a transaction and at the initial generation of the token-ID is not associated with any particular cardholder;

computer-readable medium in the one or more media for enabling, after the generating and transmitting of the token-ID, receipt of a communication from an electronic device of a cardholder where the communication includes the cardholder's credit card account number and the token-ID, said communication received by the payment gateway from the electronic device of the cardholder without said communication being accessible to the merchant server and without said communication being transmitted through the merchant server;

computer-readable medium in the one or more media for enabling storage of a record that includes the token-ID and the cardholder's credit card account number;

computer-readable medium in the one or more media for enabling, after receipt of the communication from the electronic device of a cardholder, receipt of a second request from the merchant server for payment of a specified amount, where the second request includes the token-ID;

computer-readable medium in the one or more media for enabling identification of the record based on the token-ID and determining the associated credit card account number of the cardholder to be debited;

computer-readable medium in the one or more media for enabling a determination if the cardholder's credit card account was successfully debited for the requested payment;

computer-readable medium in the one or more media for enabling transmission of a second message to the merchant server that specifies if the requested payment transaction was successfully completed whereby improved security for the cardholder's credit card information is achieved since the cardholder's credit card information is not transmitted via the merchant server during an electronic transaction.

10. The article of claim 9 wherein the first message transmitted to the merchant server also includes a form URL, where the form URL provides a form to be transmitted by the merchant server to the electronic device of the cardholder, the form identifying credit card account information of the cardholder.

11. The article of claim 9 wherein the first request contains no identification of the cardholder and no information about the transaction.

12. The article of claim 9 wherein the cardholder's credit card account is not processed for the payment of the transaction until the receipt of a second request from the merchant server.

* * * * *